(12) United States Patent
Marocchini et al.

(10) Patent No.: US 9,739,203 B2
(45) Date of Patent: Aug. 22, 2017

(54) FUEL METERING VALVE AND METHOD OF MANAGING FUEL IN A METERING VALVE

(71) Applicant: Hamilton Sundstrand Corporation, Charlotte, NC (US)

(72) Inventors: Francis P. Marocchini, Somers, CT (US); Russell P. Rourke, Jr., East Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 575 days.

(21) Appl. No.: 14/278,888

(22) Filed: May 15, 2014

(65) Prior Publication Data

US 2015/0330311 A1   Nov. 19, 2015

(51) Int. Cl.
| | |
|---|---|
| *F02C 7/232* | (2006.01) |
| *F02C 9/26* | (2006.01) |
| *F16K 31/06* | (2006.01) |
| *F02M 59/34* | (2006.01) |

(Continued)

(52) U.S. Cl.
CPC .............. *F02C 7/232* (2013.01); *F02C 9/263* (2013.01); *F02M 59/34* (2013.01); *F16K 31/0651* (2013.01); *F02M 59/366* (2013.01); *F02M 63/004* (2013.01); *F02M 63/0015* (2013.01); *F02M 63/0078* (2013.01)

(58) Field of Classification Search
CPC .. F02C 7/232; F02C 9/263; F02C 9/26; F16K 31/0651; F16K 31/06; F05B 2260/602; F23D 2209/30; F23K 5/18; F02M 63/0078; F02M 59/34; F02M 63/004; F02M 59/366

USPC ................................................ 137/15.1–15.2
See application file for complete search history.

(56) References Cited

U.S. PATENT DOCUMENTS 3,007,672 A  *  11/1961  Tischler .............. F16K 31/0651
                                                              251/129.21
3,125,321 A  *  3/1964  Van Domelen ..... F16K 31/0651
                                                              251/129.21

(Continued)

FOREIGN PATENT DOCUMENTS

| DE | WO 2007045535 A1 * | 4/2007 | ......... F16K 31/0651 |
|---|---|---|---|
| EP | 2187037 A1 | 5/2010 | |

OTHER PUBLICATIONS

Search Report regarding related EP App. No. 15001458.7; dated Oct. 14, 2015; 5 pgs.

*Primary Examiner* — Pascal M Bui Pho
*Assistant Examiner* — Alain Chau
(74) *Attorney, Agent, or Firm* — Cantor Colburn LLP

(57) ABSTRACT

A fuel metering valve includes a main flow path extending axially between an inlet and an outlet. Also included is a plunger disposed around a portion of a plunger guide, the plunger and the plunger guide configured to translate between an open position and a closed position to selectively distribute a fuel flowing through the main flow path to the outlet of the fuel metering valve. Further included is a solenoid coil disposed between a solenoid outer body and a solenoid inner body, the solenoid coil configured to magnetically attract the plunger to the open position. Yet further included is a secondary flow path for routing a stagnant volume of fuel upon translation of the plunger from the closed position to the open position.

4 Claims, 2 Drawing Sheets

(51) Int. Cl.
*F02M 63/00* (2006.01)
*F02M 59/36* (2006.01)

(56) References Cited

U.S. PATENT DOCUMENTS

| | | | | |
|---|---|---|---|---|
| 4,638,973 | A * | 1/1987 | Torrence | F16K 31/0651 251/129.02 |
| 4,986,246 | A * | 1/1991 | Kessler de Vivie | F02M 25/0836 123/519 |
| 5,351,934 | A * | 10/1994 | Jensen | F16K 1/123 251/129.1 |
| 6,446,606 | B1 * | 9/2002 | Krimmer | F02M 59/34 123/446 |
| 6,943,657 | B2 * | 9/2005 | Subramanian | F16K 31/0637 251/129.15 |
| 8,561,598 | B2 * | 10/2013 | McAlister | F02M 27/02 123/490 |
| 2004/0261771 | A1 * | 12/2004 | Ichinose | F02M 59/34 123/514 |
| 2006/0042600 | A1 * | 3/2006 | Koehler | F02M 63/0017 123/458 |
| 2009/0320797 | A1 * | 12/2009 | Takahashi | F02M 57/025 123/456 |
| 2010/0288233 | A1 * | 11/2010 | Wieland | F02M 59/205 123/446 |
| 2012/0020814 | A1 * | 1/2012 | Tano | F16K 31/06 417/289 |
| 2015/0097130 | A1 * | 4/2015 | Gieras | F16K 31/0655 251/129.19 |

\* cited by examiner

FUEL METERING VALVE AND METHOD OF MANAGING FUEL IN A METERING VALVE

BACKGROUND OF THE INVENTION

The embodiments herein relate to valves and, more particularly, to a fuel metering valve, as well as a method of managing fuel in a metering valve.

Fuel metering valves may be employed in conjunction with a number of applications, including gas turbine engines, for example. Controlling combustion of gas turbine engines has proven to have significant advantages related to engine performance and fuel efficiencies. Electronically controlled fuel metering is one such avenue for improved engine performance and fuel efficiencies. Independent fuel scheduling using a solenoid activated device has been identified as having noteworthy advantages.

To gain significant benefits, the solenoid controlled fuel metering requires that it be located relatively close to burner nozzles. Two issues that arise using a solenoid activated fuel metering device, in a hot section, are "fuel coking" and contamination. Elevating fuel temperatures increase the varnish deposits that can block and bind mechanical components and is referred to as "fuel coking." In addition, minute magnetic particles make up a significant portion of the fuel contaminates. Magnetic particles will attach to adjacent magnetic walls in the presence of a magnetic field and potentially create increased friction and binding.

Blocking and binding mechanical components is a particular consideration in jet turbine engine applications because jet fuel contains dissolved oxygen from simple exposure to atmospheric air. Reactions between dissolved oxygen and jet fuel lead to high molecular weight compounds which precipitate out of the fuel and form carbonatious deposits (i.e., "varnish"). These reactions are typically exponential with temperature. Therefore, the relatively high temperatures near the burner can raise concerns in terms of increased tendency for increased varnish formation, sometimes referred to as fuel "coking". In addition, fuel contamination (e.g., magnetic particles) can be drawn from the fuel and attach to adjacent magnetic surfaces. A solenoid activated device requires a magnetic field to move and schedule fuel flow to the engine. The presence of a magnetic field presents a challenge to prevent the accumulation of magnetic particles that are constantly flowing thru the fuel stream.

BRIEF DESCRIPTION OF THE INVENTION

According to one embodiment, a fuel metering valve includes a main flow path extending axially between an inlet and an outlet. Also included is a plunger disposed around a portion of a plunger guide, the plunger and the plunger guide configured to translate between an open position and a closed position to selectively distribute a fuel flowing through the main flow path to the outlet of the fuel metering valve. Further included is a solenoid coil disposed between a solenoid outer body and a solenoid inner body, the solenoid coil configured to magnetically attract the plunger to the open position. Yet further included is a secondary flow path for routing a stagnant volume of fuel upon translation of the plunger from the closed position to the open position.

According to another embodiment, a method of managing fuel in a metering valve is provided. The method includes routing a fuel through a main flow path from an inlet to an outlet. The method also includes translating a plunger within a solenoid outer body between a closed position and an open position. The method further includes displacing a stagnant volume of fuel within a secondary flow path as the plunger translates from the closed position to the open position.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
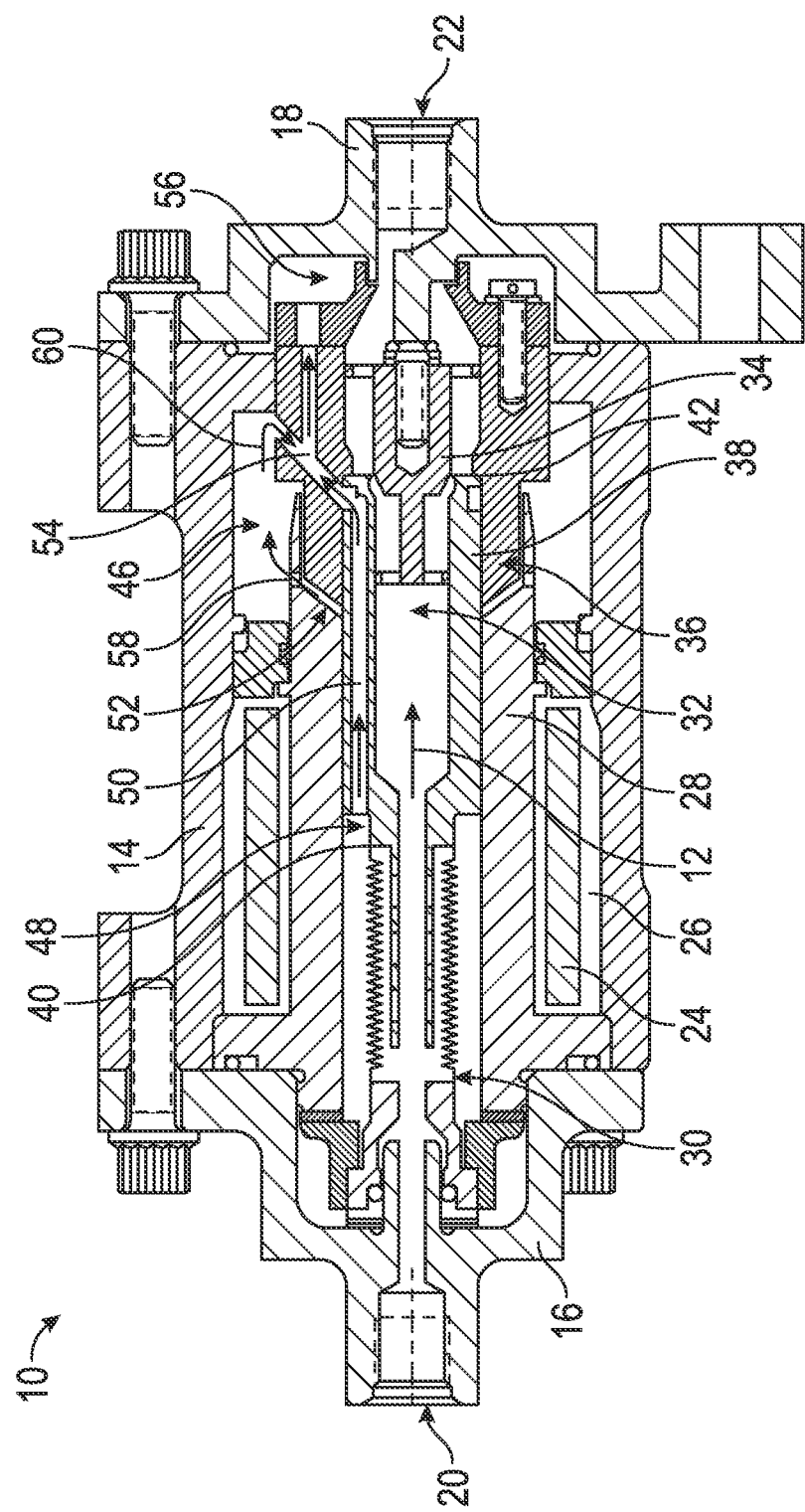
FIG. 1 is a cross-sectional view of a fuel metering valve in a closed position.
Figure 2:
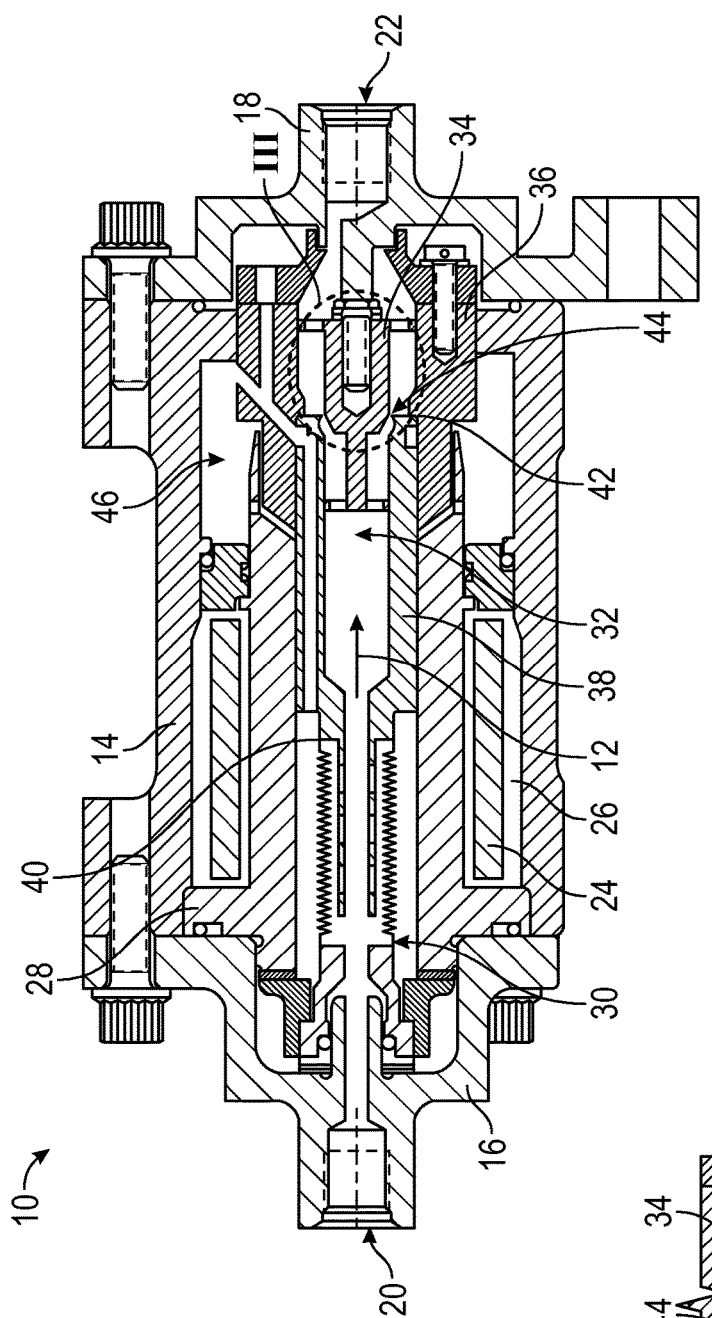
FIG. 2 is a cross-sectional view of the fuel metering valve in an open position.

Referring to FIGS. 1 and 2, a cross-sectional view of a fuel metering valve 10 is schematically illustrated. The fuel metering valve 10 provides a restriction which is controlled such that a predetermined flow rate of a fuel 12 is established along a main flow path and such that a known predetermined flow rate of the fuel 12 is provided to a combustion region within the engine. The fuel metering valve 10 may be employed in numerous contemplated applications requiring controlled liquid distribution. In one embodiment, the fuel metering valve 10 is employed in a gas turbine engine and regulates the flow rate of the fuel 12 to a combustion chamber (not illustrated) of a gas turbine engine.

The fuel metering valve 10 may be categorized as an electromechanical metering device comprising two general sub-assemblies. The first general sub-assembly is a motoring section, or controlling section, that includes a solenoid structure. The solenoid structure includes a solenoid outer body 14 having a first plate 16 and a second plate 18 fixed thereto at opposing ends. The first plate 16 defines an inlet 20 configured to receive the fuel 12 from a fuel source (not shown) and the second plate 18 defines an outlet 22 configured to route the fuel 12 to a combustion chamber, as described above. A solenoid coil 24 is located in an annular passage 26 between the solenoid outer body 14 and a solenoid inner body 28. The solenoid inner body 28 is formed of a metallic and -magnetic material.

Figure 3:
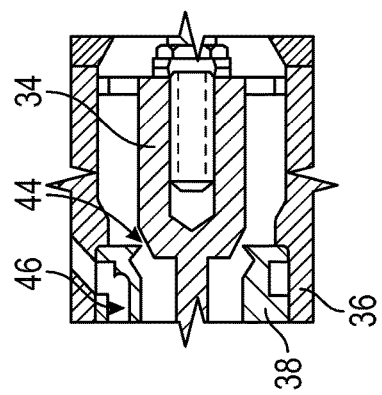
FIG. 3 is an enlarged view of section III of FIG. 2.

The second general sub-assembly comprises mechanical metering components configured to selectively distribute the fuel 12 to the combustion chamber through the outlet 22 of the fuel metering valve 10. A sealing device 30, such as a bellows device, is employed to seal the fuel 12 that is flowing through a main flow path 32 that extends from the inlet 20 to the outlet 22 of the fuel metering valve 10. In addition, it provides the closing force required to shut the fuel 12 to the outlet 22. A spool 34 is fixed to the second plate 18 proximate the outlet 22. To operatively couple the two sub-assemblies (i.e., solenoid structure and mechanical metering components), a plunger 36 and a plunger guide 38 are included. The plunger guide 38 is operatively coupled to the sealing device 30 (e.g., bellows device) proximate a first plunger guide end 40 and is in contact with the plunger 36 proximate a second plunger guide end 42. The plunger 36 is disposed circumferentially about a portion of the plunger guide 38 and translates based on a magnetic attraction between the plunger 36 and the solenoid coil 24 in response to an electric input to the solenoid coil 24. The contact between the plunger 36 and the plunger guide 38 is in a manner that translates the plunger guide 38 upon translation of the plunger 36. In particular, translation of the plunger 36 and plunger guide 38 toward the solenoid coil 24 results in translation of the plunger 36 from a closed position (FIG. 1) to an open position (FIG. 2) of the fuel metering valve 10. In the open position, an annular gap 44 between the plunger guide 38 and the spool 34 is achieved, as best illustrated in FIG. 3. In the open position, the annular gap 44 controls fuel flow toward the outlet 22 of the fuel metering valve 10.

Due to inherently slight leakage from the main flow path 32, the leaked fuel ends up in a secondary flow path 46. The secondary flow path 46 includes a first volume 48 located radially outwardly of the sealing device 30 between the solenoid inner body 28 and the sealing device 30. During translation of the plunger 36 to the open position, the plunger 36 displaces a volume of the fuel 12 located in the first volume 48. To avoid affecting the metered flow of the fuel 12 flowing through the main flow path 32, the fuel in the first volume 48 is isolated in the secondary flow path 46. The secondary flow path 46 includes the aforementioned first volume 48, a channel 50 extending axially from the first volume 48 through the plunger guide 38. Additionally, the secondary flow path 46 includes a second volume 52 located between the solenoid outer body 14, the solenoid inner body 28 and the plunger 36. A passage circuit 54 defined by the plunger 36 fluidly couples the first volume 48 and the second volume 52 to a third volume 56 that is partially defined by the second plate 18 proximate the outlet 22.

The third volume 56 is substantially equal to the sum of the first volume 48 and the second volume 52. By equating the third volume 56 to the sum of the first volume 48 and the second volume 52, the secondary flow path 46 provides a flow circuit that allows the fluid present within the secondary flow path 46 to displace from forward regions of the fuel metering valve 10 to aft regions of the fuel metering valve 10 upon translation of the plunger 36 from the closed position to the open position. A specific location of fuel that is displaced from the second volume 52 is routed through a solenoid inner body aperture 58 that leads to a cavity and toward the passage circuit 54 described above. The fuel located within the secondary flow path 46 may be referred to as a stagnant volume of fuel 60 based on its continued isolation and presence within the secondary flow path 46.

Advantageously, isolating this portion of fuel prevents new oxygenated fuel from entering the cavities of the secondary flow path 46, thereby reducing or preventing the formation of coking and the entry of new contaminate. The stagnant volume of fuel 60 becomes de-oxygenated, thereby diminishing the formation of varnish/coking. Additionally, a significant reduction in the accumulation of magnetic particles that may adhere to adjacent magnetic walls is achieved. The secondary flow path 46 contains a limited amount of fuel that will be contained and prevents additional contaminate from entering and attaching to magnetic walls. An additional benefit of the fuel circuitry is the introduction of controlled restrictions to optimize dampening of the translating plunger 36 and plunger guide 38.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel metering valve comprising:
   a main flow path extending axially between an inlet and an outlet;
   a plunger disposed around a portion of a plunger guide, the plunger and the plunger guide configured to translate between an open position and a closed position to selectively distribute a fuel flowing through the main flow path to the outlet of the fuel metering valve;
   a solenoid coil disposed between a solenoid outer body and a solenoid inner body, the solenoid coil configured to magnetically attract the plunger to the open position; and
   a secondary flow path for routing a stagnant volume of fuel upon translation of the plunger from the closed position to the open position, the secondary fuel path comprising:
      a first volume located between the solenoid inner body and a seal proximate a forward face of the plunger guide;
      a channel defined by the plunger guide and extending from the first volume;
      a second volume at least partially defined by the solenoid outer body, the solenoid inner body, and the plunger;
      a third volume at least partially defined by an end plate of the fuel metering valve proximate the outlet;
      a passage circuit defined by the plunger and fluidly coupling the first volume, the second volume and the third volume, the volume of the third volume equal to the sum of the first volume and the second volume; and
      a solenoid inner body aperture fluidly coupled to the second volume, the plunger displacing the stagnant volume of fuel upon translation from the closed position to the open position, a portion of the stagnant volume of fuel disposed between the plunger and the solenoid inner body displaced through the solenoid inner body aperture.

2. The fuel metering valve of claim 1, wherein the solenoid inner body is formed of a magnetic material.

3. The fuel metering valve of claim 1, wherein the stagnant volume of fuel is de-oxygenated in the secondary flow path.

4. The fuel metering valve of claim 1, wherein the plunger guide extends between a bellows seal and the plunger.

* * * * *